May 23, 1967  J. A. PARTLOW ETAL  3,320,662
APPARATUS FOR ROTOR LAMINATION SKEW CHANGE
Original Filed May 22, 1963  4 Sheets-Sheet 4
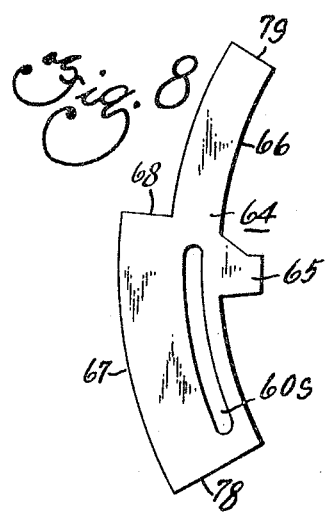
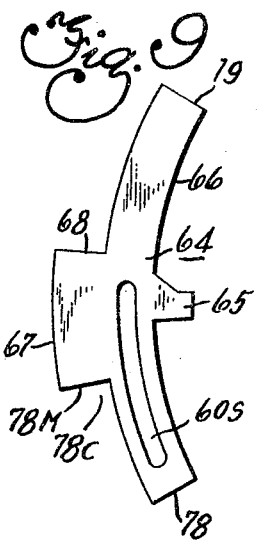
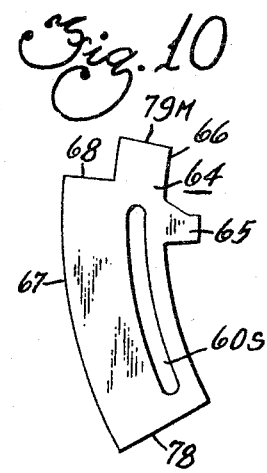
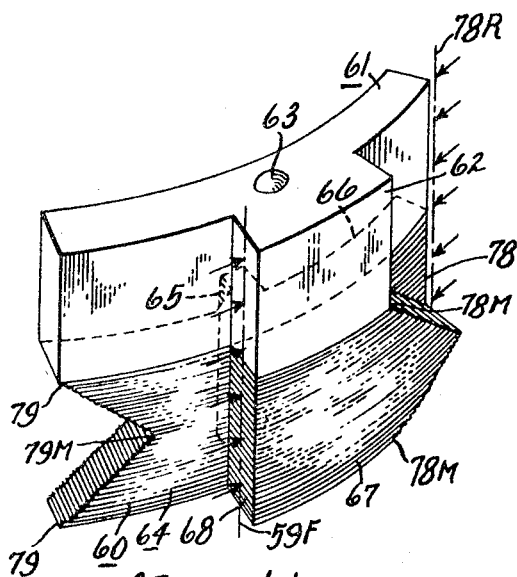
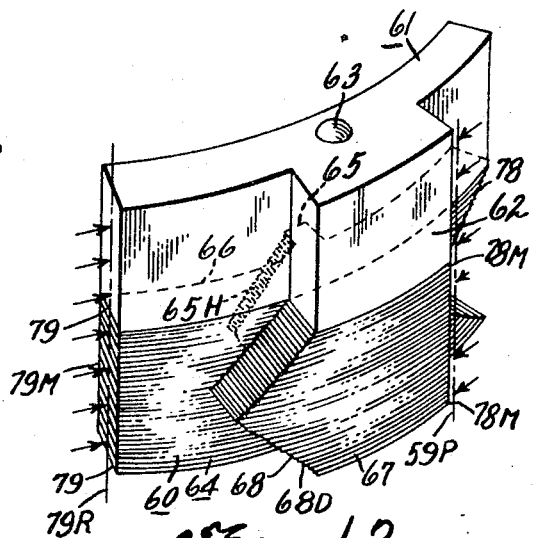
INVENTORS
JAMES A. PARTLOW
ALBERT B. MEWHINNEY
RAYMOND C. HOEFLING
BY Albert H. Reuther
THEIR ATTORNEY

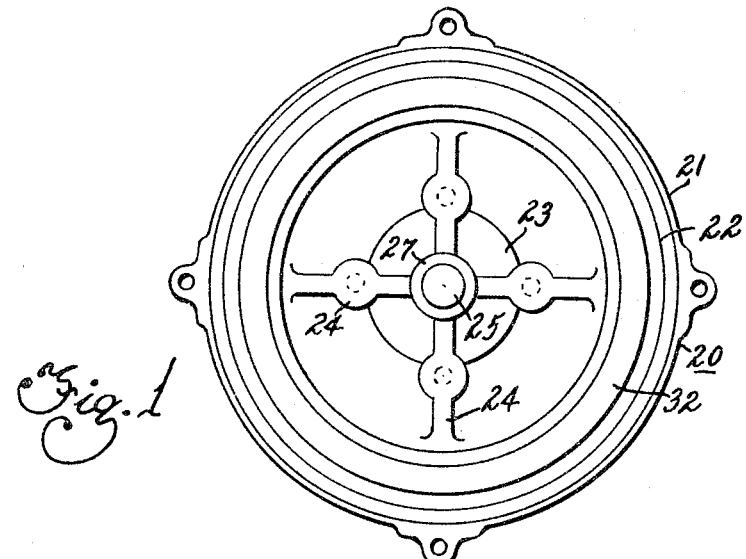
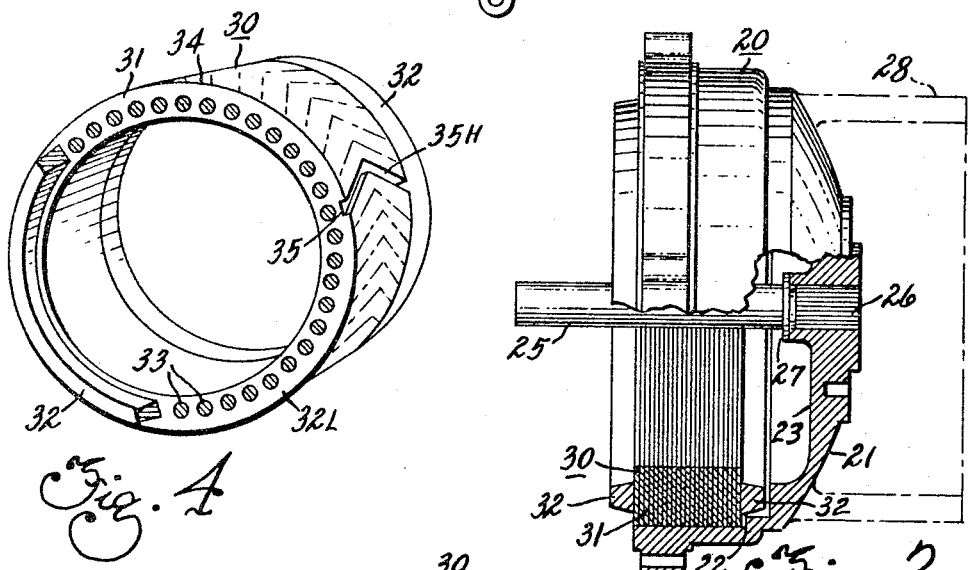
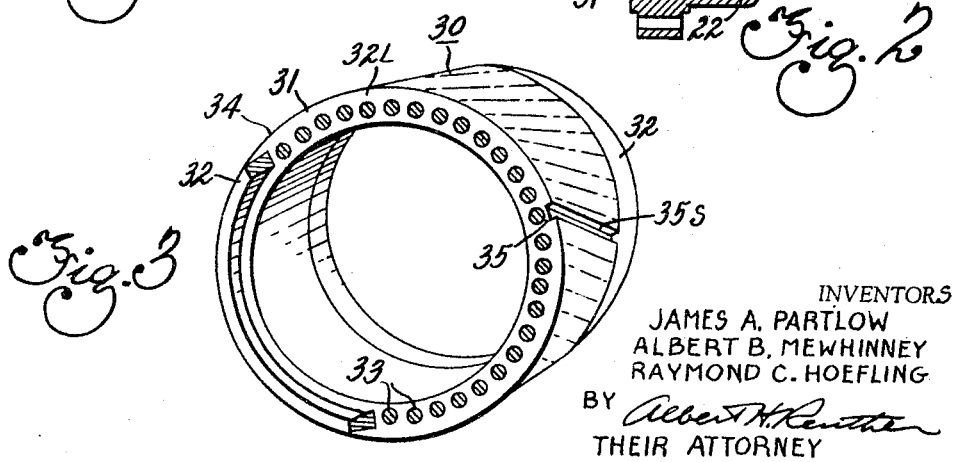

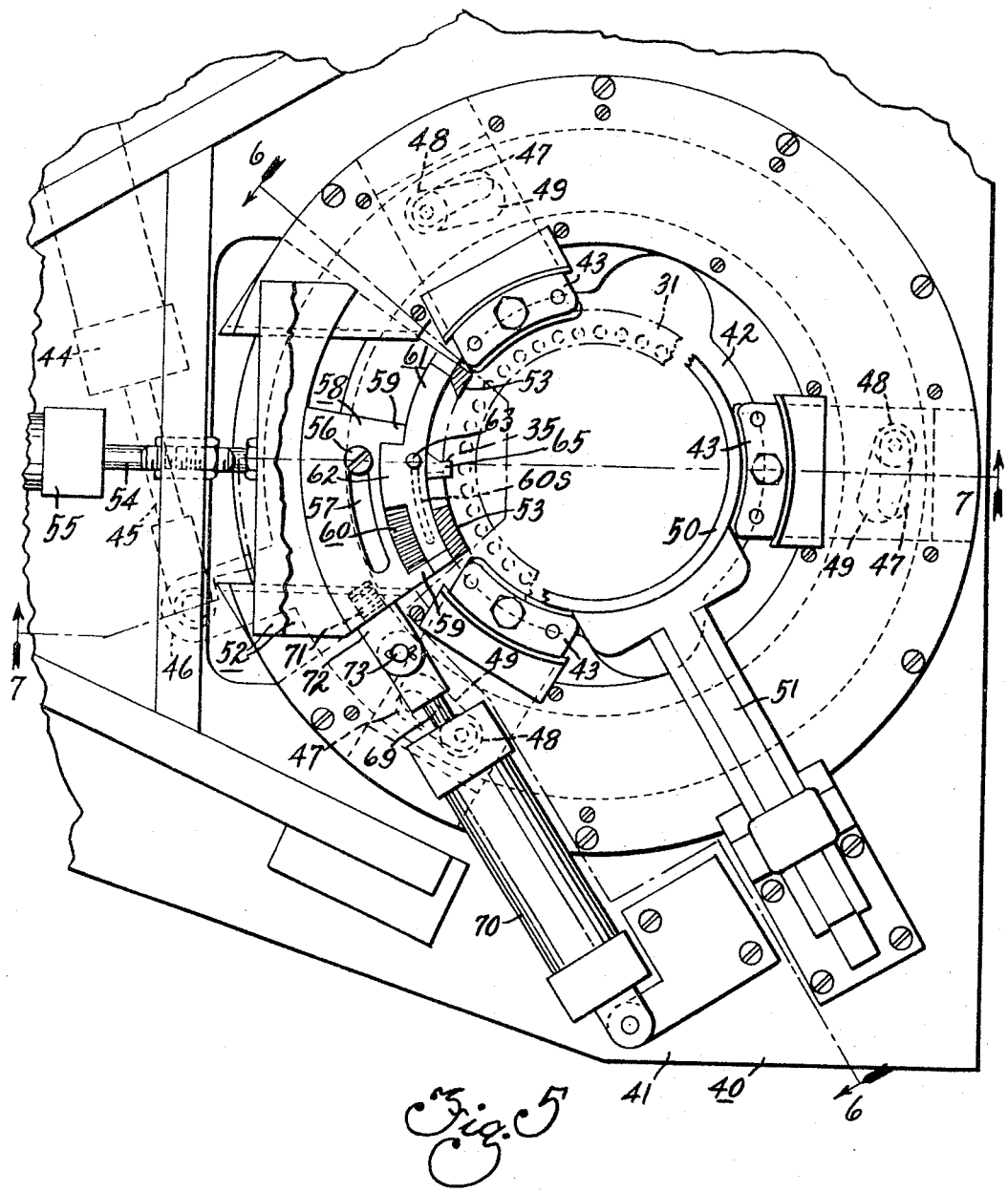

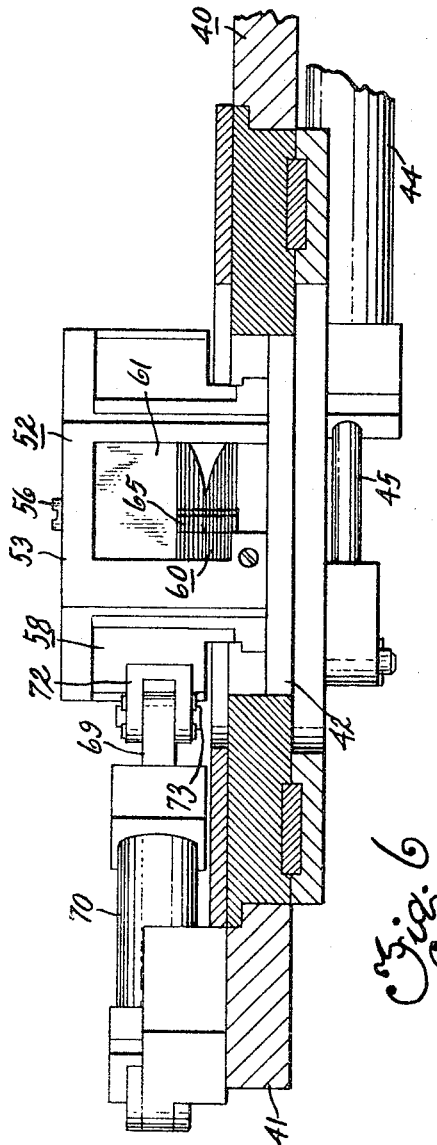
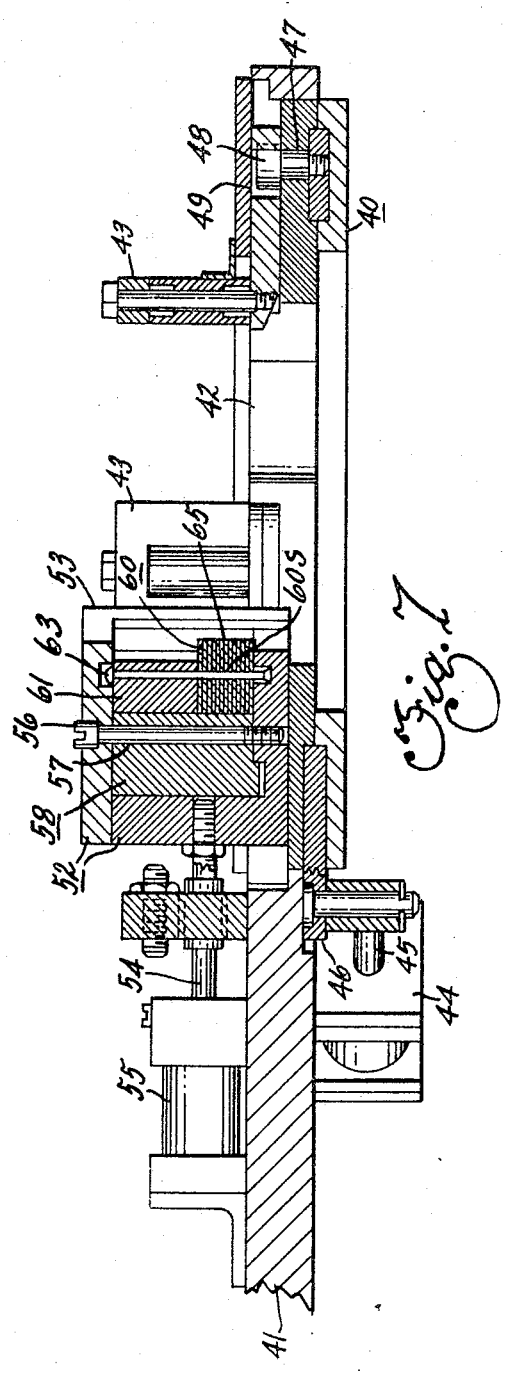

United States Patent Office 3,320,662
Patented May 23, 1967

3,320,662
APPARATUS FOR ROTOR LAMINATION
SKEW CHANGE
James A. Partlow, Vandalia, and Albert B. Mewhinney
and Raymond C. Hoefling, Dayton, Ohio, assignors to
General Motors Corporation, Detroit, Mich., a corporation of Delaware
Original application May 22, 1963, Ser. No. 282,335.
Divided and this application Apr. 5, 1966, Ser. No. 540,419
6 Claims. (Cl. 29—205)

This is a division of copending application Ser. No. 282,335—Partlow et al. filed May 22, 1963, and belonging to the assignee of the present invention.

This invention relates to manufacture of components of a dynamoelectric machine, and, more particularly, to apparatus to facilitate skewing of laminations for a dynamoelectric machine rotor means.

An object of this invention is to provide a new and improved arrangement to manufacture rotor components having conductor slots skewable into infinitely variable configurations accomplished by shifting of multiple shim means movable subject to engagement of opposite collectively straight edging positions thereon.

Another object of this invention is to provide a stacked lamination slot skewing apparatus including a shiftable shim means collectively formed by a plurality of semi-arcuate sheet-like segments each having a corresponding slot extending at least partially along a shim means body portion to fit radially outwardly from a stack of rotor laminations each provided with a cutout or notch engaged by a tab-like projection which is located intermediate opposite end edges of the shim means body portion subject to differentiation in length respectively therebetween and including an outer peripheral shoulder-forming portion alignable on opposite ends thereof as to the cutout or notch and initially engageable in a straight-edge manner corresponding to straight positioning of the tab-like projections of the shim means body portion subject to shim means shifting under force applied to straighten opposite edging of the shim means shoulder-forming portion while simultaneously collectively shifting the tab-like projections fitted to the lamination cutout or notch correspondingly skewed in accordance with length of individual shim means and intermediate positioning of the tab-like projections thereof.

Another object of this invention is to provide an apparatus for skewing slot configuration of a stack of axially positioned rotor laminations each having a radially inwardly extending slot located at least partially adjacent to an inner periphery along a crescent-shaped shim means body portion to fit radially outwardly from the stack of laminations subject to steps of first positioning the shim means to have an outer shoulder edging thereof engaged under pushing force to a straight edge stop effected by engagement of shim edging at one end thereof thereby corresponding to axial alignment of the laminations as to each other while simultaneously simulating a predetermined infinite number of slot skew configurations to be slanted, curved, sinusoidal, herringbone and the like in conditioning achieved by an opposite shoulder notching engageable under pushing force in an opposing direction again to a straight edge stop effected by engagement of opposite shim edging such that a radially inwardly extending tab-like projection integral with the shim means collectively can effect a mirror-like reverse pattern of skewing configuration according to collective stacking and shifting of the shim means.

A further object of this invention is to provide an apparatus for skewing slot configuration of a stack of axially positioned rotor laminations of an inside-out dynamoelectric machine to have a cast metal winding added thereto subject to assembled retention within an outer rotatable member which can carry fan blade means radially and axially thereof and which can cover an outer notching in the rotor lamination against which tab-like lateral projections of shim means fit subject to shifting thereof due to straight edge right-angle engagement in opposite directions against edges of shim means which have a range of thickness between a fifth of and equal to thickness of lamination metal which is shifted into predetermined skew configuration of slots therethrough in accordance with variation in arcuate length of the shim means always engaged transversely by push shifting on straight edging rather than angularly with any sloping member which would transmit force to include a bending component detrimental to laminations, shim means and the like needed for accurate skewing.

Another object of this invention is to provide an apparatus for skewing internal slot configuration of a magnetic core component having a plurality of laminations stacked axially adjacent to each other and having an external notch subjected to steps of positioning plural shim means each having a semi-arcuate shape and radially inwardly extending tab-like projection which fits into the external notch of the lamination stack-up, initially maintaining vertical positioning of the tab-like projections as to the external notch of the laminations though simultaneously there is initial pushing of the shim means in one direction against a first substantially straight wall stop, then oppositely pushing and shifting the shim means against a second substantially straight wall stop, the pushing and shifting occurring always in a plane substantially perpendicular to that of the shim means per se free of any bending component of force as to both shim means and laminations which are all subjected to shifting under force transmitted coplanar thereto collectively, and aligning a predetermined slot skew arrangement internally by transmitting force applied to the projections of the shim means externally against the notching of the laminations which are shifted in proportion to differing arcuate length of individual shim means progressively changing in distance between opposite radially extending edging thereof.

Further objects and advantages of the present invention will be apparent from the following description, reference being had to the accompanying drawings wherein preferred embodiments of the present invention are clearly shown.

In the drawings:

FIGURE 1 is an end view of a rotor assembly to have features resulting from use of procedure and apparatus in accordance with the present invention.

FIGURE 2 is a partially sectioned elevational view of the rotor assembly of FIGURE 1.

FIGURE 3 is a perspective view of a magnetic core having slanted skew slot configuration for use in the assembly of FIGURES 1 and 2 as achievable in accordance with the present invention.

FIGURE 4 is a perspective view of another magnetic core having herringbone skew slot configuration for use in the assembly of FIGURES 1 and 2 as achievable in accordance with the present invention.

FIGURE 5 is a plan view of apparatus including externally engageable shim means for proceeding to effect rotor lamination skewing of internal slot configuration.

FIGURE 6 is a sectional view taken along line 6—6 in FIGURE 5 to show details of skewing mechanism.

FIGURE 7 is a sectional view taken along line 7—7 in FIGURE 5.

FIGURE 8 is a plan view of a blank for shim means used in the apparatus of FIGURE 5.

FIGURE 9 is a plan view of one of a pair of outside shim means used in the apparatus of FIGURE 5.

FIGURE 10 is a plan view of one of a pair of center shim means used in the apparatus of FIGURE 5.

FIGURE 11 is a perspective view of shim means in one position for substantially straight axial alignment of tab-like projections collectively.

FIGURE 12 is a perspective view of the same shim means of FIGURE 11 in an opposite position for herringbone alignment of slotted rotor laminations engaged accordingly by the tab-like projetcions collectively.

In FIGURE 1 there is an end view of a rotor means generally indicated by numeral 20 and including parts or components which can be seen in further detail in a view of FIGURE 2 as well as in views of FIGURES 3 and/or 4. As shown in views of FIGURES 1 and 2, the rotor means 20 includes a substantially cup-shaped or bell-like die casting body portion 21 having a substantially cylindrical spacing 22 therein closed off along one side by an integral hub-like portion 23 reinforced by plural rib means 24 extending radially thereof. A suitable axially extending shaft means 25 can be force fitted at an end 26 thereof to the cast-metal hub portion 23 and a suitable thrust bearing means 27 can be provided therewith as shown. A plurality of optional fan-mounting holes can be provided with the cast metal bell-like portion and/or fan blade means 28 indicated in FIGURE 2 can be provided as attached or formed integrally with the bell-like cast portion. These fan blade means 28 extend axially to one side of the bell-like cast portion as shown in FIGURE 2. Reference can be made to a U.S. Patent 2,990,112—Levy, et al. issued June 27, 1961 to the assignee of the present invention having corresponding disclosure of Canadian Patent 640,062—Levy et al. issued Apr. 17, 1962, and showing a ventilating means and further details of a dynamoelectric machine which can use a rotor means of the type shown by FIGURES 1 and 2 of the drawings. This rotor means 20 thus, in effect, can be used with a so-called inside-out motor means for purposes of ventilation and conceivably for rotating a drum of an appliance such as a clothes dryer and the like.

The rotor means of FIGURES 1 and 2 can further include a rotor lamination assembly generally indicated by numeral 30 having a slotted magnetic core 31 and a squirrel cage winding cast therewith in a usual manner in a mold relative to the rotor lamination assembly to have opposite end ring means 32 interconnecting the metal cast through the slots of the magnetic core 31. The magnetic core 31 has an outer periphery fitted into tight engagement with an inner periphery of the annular portion 21 of cast metal which can be heated upwardly to substantially 275° F. for limited expansion followed by cooling and shrink fit thereof onto the outer periphery of the rotor magnetic core 31. A flush assembly of the magnetic core 31 can be provided relative to a free edge of the annular portion 21 as seen in FIGURE 2. The annular portion 21 as well as the hub portion 23 can be made of cast aluminum or a similar light weight metal which also can be used for the squirrel cage winding means including the end ring means 32 in a well-known manner. However, it is to be understood that the annular portion 21 as well as the hub and possible integral fan blade means 28 can be cast of a suitable plastic material including phenolic or Bakelite, acetal resin or Delrin as well as other suitable materials.

Views of FIGURES 3 and 4 illustrate differing slot skew arrangements for the slotted magnetic core 31 having end ring means 32 as part of a squirrel cage winding means of cast metal added thereto by use of a suitable die casting mold means. Each of the slotted magnetic core means 31 can include a stack-up of a plurality of laminations 32L having radially located slots 33 therein as well as an outer peripheral edging 34 into which a radially inwardly extending cutout or notch 35 is provided. Initially, such cutouts or notches 35 are axially aligned relative to each other for each of the laminations 32L such that the notches collectively extend substantially parallel to and longitudinally of a central axis through the magnetic core 31 corresponding to an axis of shaft means 25. However, in accordance with the present invention, by use of apparatus and procedure for rotor lamination slot skew changing, there can be differing configurations of skewing of the slots due to relative positioning of the notches 35 into a slanted configuration 35S represented in FIGURE 3, a herringbone configuration represented by 35H in FIGURE 4 as well as other curved and even sinusoidal configurations as shown, for example, in an expired U.S. Patent 1,861,059—Johnson issued May 31, 1932. It is to be understood that the particular skew configuration per se for the rotor component regardless of differing shape thereof as well known in the art can now be achieved more effectively and efficiently by use of features of apparatus and procedure in accordance with the present invention.

It is to be understood that due to outer peripheral curvature of edging 34 a problem exists, for example, even to form a straight slanted skew arrangement such as represented by reference 35S in FIGURE 3. Thus, a straight bar or keyway becomes increasingly difficult to use with accuracy particularly for greater skew angles for at least two reasons including the foregoing outer peripheral curvature as well as a necessary component of force from such a straight key means which would transmit force to include a bending component detrimental to flat or sheet-like laminations and the like. Due to such a bending component in a direction which would intersect a flat plane extending through each of the laminations there is difficulty in achieving proper shifting of such laminations into a quickly formed skewing arrangement of the slots therewith prior to die casting of molten metal as a squirrel cage winding means with end ring means therefor. On a high volume mass production assembly operation, it is desirable to have skewing of such magnetic core slots achieved as quickly and accurately as possible. Apparatus and procedure in accordance with the present invention permits achievement of change in skewing of rotor lamination slots into differing configurations including a so-called herringbone as well as complex curves and sinusoidal patterns and the like. The apparatus and procedure in accordance with the present invention make it possible to obtain a sharp skew regardless of complexity of the particular formation to be provided and regardless of the angular displacement of the slot alignment from longitudinal and axial arrangement without need for appreciably deeper cutouts or notches 35 to compensate for outer peripheral curvature of the laminations collectively and also without detrimentally affecting magnetic quality of the slotted core 31.

In FIGURE 5 there is shown apparatus generally indicated by numeral 40 including a base or work table-like portion 41 having a station or location 42 onto which a magnetic core means 31 can be fitted in a well-known manner. These slotted laminations can be aligned axially relative to each other on an arbor of a type shown, for example, by a U.S. Patent 3,006,062—Loy issued Oct. 31, 1961, on a machine and U.S. Patent 2,910,767—Loy issued Nov. 3, 1959, on a method of assembling laminated stators or magnetic assemblies belonging to the assignee of the present invention.

The apparatus 40 further includes a plurality of adjustable clamp means 43 which can engage a lamination stack-up for retention purposes and which can be shifted radially inwardly and outwardly in accordance with movement of an actuator 44 having a piston therein carrying a rod 45 secured to an outward projection 46 of an annular disc means slotted in plural locations 47 as indicated in views of FIGURES 5 and 7 such that roller means 48 are cooperable with the slot-like cutouts 47 as well as cutouts 49 for axial centering of the laminations of the core 31. A skillet-like C-shaped cover means generally indicated by numeral 50 can be moved out of and into axial engagement with a lamination stack-up in accordance with movement of arm means 51. The clamp means 43 as well as the cover means 50 are shown to illustrate positioning and retention of stacked laminations during mounting thereof at a work station 42. It is to be understood that any suitable fastening and retention means for the stack-up of laminations can be provided.

Views of FIGURES 5, 6 and 7 further show a frame means 52 having a curved or semi-arcuate radially inner periphery 53 complementary to that of outer periphery of a magnetic core means 31 having radially inwardly extending cutouts or notches 35 therein as noted earlier. This frame means 52 and curved periphery 53 thereof can be reciprocably positioned radially inwardly and outwardly of the magnetic core 31 by fluid actuation or powering applied thereto by a rod means 54 projecting longitudinally and axially from an actuator such as an air cylinder 55 which can have a piston carrying the rod means 54 to be reciprocable therewith. Pressurized fluid such as compressed air or hydraulic medium under pressure can be applied selectively to opposite sides of such a piston for reciprocable movement thereof in a well-known manner. The frame means 52 can include a pair of complementary portions held assembled to each other by a through bolt means 56 which can serve as a guide or pin fitted through a curved inner slot 57 of a semi-arcuate or curved U-shaped member 58 with integral radially inwardly extending legs or projections 59.

These projections 59 can engage a shim means generally indicated by numeral 60 to provide features of apparatus and procedure in accordance with the present invention. The shim means 60 can be collectively positioned and retained adjacent to the semi-arcuate periphery 53 of the frame means 52 for a depth dimension corresponding substantially to that of the depth dimension of a particular slotted magnetic core 31 to be made of a plurality of magnetic laminations having the notches 35 along an outer periphery thereof. A spacer means 61 having a substantially crescent-shaped configuration with inner and outer curved surfaces as well as a radially outwardly extending projecting shoulder 62 can be provided to fill space provided by the frame means 52 and supplemental to the stack-up of shim means 60. A suitable fastening means 63 holds the spacer means 61 and shim means 60 collectively in assembled relationship to each other subject to shifting of the shim means within a predetermined range of movement as permitted by a slot 60S collectively formed by the shim means 60 each having a blanked arcuate body portion 64 as indicated in FIGURE 8 of the drawings. The shim means all have a tab-like radially inwardly extending projection 65 which can be seen in views of FIGURES 5 through 12 inclusive. Each shim means includes a curved or semi-arcuate inner peripheral edging 66 substantially complementary to outer peripheral edging of the annular laminations. Each shim means can be made of a spring-stock steel which is relatively thin and flexible yet strong as to forces applied coplanar thereto. Thickness of the shim means can be in a range between one-fifth to equal that of lamination metal which, for example, commonly has a thickness of substantially .025" and the like. Thus, for example, the number of shim means can total a minimum of the same number as the number of laminations and upwards to five times the number of laminations. Each shim means body portion includes a radially outwardly projecting shoulder portion 67 integral therewith and having variation in arcuate length thereof between opposite edging of which a radially extending edging 68 in an intermediate location corresponding to that of the tab-like projections 65 is maintained for each of the shim means body portions subject to engagement by one of the projections 59 to transmit a straight-line force 59F indicated in FIGURE 11 thereagainst by retraction of a rod 69 which projects from an actuator 70 having a piston reciprocably provided therein and carrying the rod 69. The actuator 70 is fluid actuated by a gaseous medium or hydraulic means under pressure. The free end of the rod 69 is secured to the shiftable member 58 as indicated in FIGURE 5. Suitable threading 71 of a fitting 72 can interconnect by way of a pin 73 to the rod 69 of the actuator 70. The actuator 70 as well as the actuator 55 can be suitably mounted to the base or work portion 41 by bolts and the like as indicated. The shoulder 67 can have an opposite radial edging 78 coincident with that of the main body portion 64 as indicated in the blank of FIGURE 8 and for the center shim of FIGURE 10. A total of two such center shims can be provided for purposes of rigidity and stability and a pair of outside shims illustrated by FIGURE 9 can be provided to have a cutout 78C from the shoulder means 67 to a minimum size of the shoulder portion arcuately defined between edging 68 and minimum edging 78M shown in FIGURE 9. It is to be understood that the arcuate distance of the shoulder portion 67 between the edging 68 and minimum edging 78M will be substantially equal to the arcuate distance of a shoulder portion 62 of a spacer means 61 as seen in views of FIGURES 11 and 12. The thickness of the outside shim means such as illustrated in FIGURE 9 can be slightly greater than that of the remaining intermediate shim means so as to provide a ledge of greater thickness with a larger arcuate inward projection radially inwardly from the curved surfacing 66 such that individual rotor laminations are prevented from sliding below the shim means stack-up. Such a thicker bottom spacing plate is optional but can be advantageously used under certain circumstances. Each shim means body portion 64 has an opposite radial edging 79 located a maximum distance arcuately away from the edging 78 as shown by the blank for the shims individually of FIGURE 8. This edging 79 is maintained for the outside shim means of FIGURE 9. However, the edging 79 is reduced in increments to a minimum location 79M indicated for the center shim means of FIGURE 10. The force represented by reference numeral 59F in FIGURE 11 is, in effect, a pulling or retracting force applied by way of the rod 69. Conversely, a pushing force 59P as represented in FIGURE 12 can be applied against edging of the shoulder portion 67 represented in a range of cutouts for edging corresponding to that of numeral 78 up to and including edging of the minimum value represented by reference numeral 78M. Depending upon the configuration and distances arcuately of the shoulder portions intermediate the outer shim means, there can be a predetermined skewing arrangement achieved. The view of FIGURE 12 represents a herringbone skewing arrangement indicated by reference numeral 65H which corresponds to an outer displacement of edging 68 of individual laminations into a collective formation of displaced edging 68D indicated in FIGURE 12. It is to be noted that in the view of FIGURE 11 the force 59F is applied against the edging 68 such that a stop or reaction force 78R is encountered in a substantially perpendicular or straight line location relative to the plane of the shim means collectively subjected to shifting force or push indicated by reference numeral 59P in FIGURE 12. Conversely, another straight line stop or reaction represented by 79R is encountered when the shim means are shifted as shown in FIGURE 12. Thus, the shifting of the shim means generally indicated by numeral 60 always occurs by applying force collectively coplanar with the shim means body portion 64 free of any bending component of force which would be encountered in any attempt to use a straight key-like tool for attempting any slanted or curved skew arrangement. Such key means would be quite unsuitable particularly for more complex configurations such as a sinusoidal or herringbone shape which can be instantaneously achieved by using features in accordance with the present invention. The shim means are particularly advantageous because they are made of thin though resilient and strong material which can be subjected to coplanar forces for translating the tab-like projection 65 from the axial or straight alignment shown by FIGURE 11 quickly changeable by shifting of the shim means into a predetermined alignment configuration such as the herringbone shape illustrated by FIGURE 12. In all instances, the shim means collectively determine the skew arrangement to be formed instantaneously. The force and stopping reaction in either of opposite directions of movement of the shim means collectively can be encountered with a straight wall-like stop and straight line of exertion of force for pulling and/or pushing so far as shifting of the shim means is concerned. There is no need whatever for any attempt to use a sloping key member and the like in any attempt to rearrange the laminations and thus all bending components of force as to the laminations as well as the shim means can be completely avoided. Exertion of force in a straight edge manner permits useful application of such force more effectively for instantaneously obtaining a sharp skewing arrangement regardless of the complexity of the configuration to be formed so far as the slots are concerned.

It is further to be noted that the work station represented in FIGURE 5 can be used for instantaneously skewing and aligning the slotted laminations into a skewed arrangement. This same work station can be a location in which opposite die casting die portions are clamped to opposite sides of the stacked laminations such that the laminations held between such die casting die portions can be forwarded to a die casting machine where molten metal such as aluminum can be caused to be cast to fill the skewed slots and to form the shorting or interconnecting end ring means on opposite axial ends thereof. A pair of operators can be provided for the casting machine and for the apparatus and procedure for skewing the laminations in accordance with the present invention with even a quenching medium such as water in a container being provided in a location intermediate the die casting machine and skewing means. Thus, a minimum number of die casting die portions can be utilized for completion of a repetitive cycle of operations for accomplishing instantaneous skewing with a high degree of accuracy regardless of sharpness of angular relationship of the slot skewing followed by a rapid die casting operation for supply of rotor lamination components which can be forwarded on a conveyor means or other suitable transmitting medium to an assembly line for inside-out dynamoelectric machine means and the like. It is to be understood that the die casting operation can include provision for integrally forming the bell-like body portion of the rotor including axially projecting fan blades if so desired.

It is to be noted that the tab-like projections 65 collectively are in straight alignment while the edging 79 forms a female-like arrangement and the corresponding edging 78 of the body portion 64 abuts against a straight-wall-like stop within the frame means 52. Simultaneously the differentially cut out remaining edging 78 arcuately in alignment with the shoulder portion 67 forms a male or arrow-like prong formation also illustrated in FIGURE 11.

Conversely, upon application of force against the edging 78 in alignment with the shoulder portion 67 the remaining edging 78 in alignment with the body portion 64 of the shim means forms such a female-like cavity or recess while the edging 79 abuts against a straight-wall-like stop provided by an opposite side of the frame means. Simultaneously, there is a mirror-like image of the herringbone slot arrangement represented by reference numeral 65H for alignment of the tab-like projections 65 collectively corresponding to the male or arrow-like prong formation of the edging 68 into a displaced condition represented by reference numeral 68D.

The shim means are cut from the blank therefor as shown in FIGURE 8 and there is a predetermined index cutting of the shim blanks from the position of the outside shim in predetermined increments, for example, in a range between 14° and 15° cutting of pairs of shims to be fitted in corresponding positions on either side of a center of a shim stack-up. Ultimately, a complete collection of shims can be assembled for limited shifting movement determined by the arcuate range of the shim stack-up formed collectively thereby and the shim means can be placed in a particular sequence one on each side of the center shims until a thickness of a predetermined number of shims is obtained. For example, a total of 152 shims can be used for a lamination stack-up of substantially 1.25". The fastening means 63 shown in the view of FIGURE 7 can be a rivet-like member with opposite flattened head portions. Collectively the shim means can be arranged in an infinite number of predetermined shapes according to the build up provided by differing lengths of the arcuate body portion and integral shoulder portions between opposite edging thereof.

It is to be noted that the width of the tab-like projections 65 can be varied for strength purposes. However, regardless of the width thereof the shifting forces for accomplishing instantaneous skew changing will be transmitted coplanar with the shim means by application of force on a straight-wall-like edging collectively formed by the shim means subject to corresponding straight-wall-like stopping or reaction upon completion of shifting of the shim means in each of opposite directions of movement. The edging or ends of the shim means form a staggered or stair-stop like incremental configuration summarily corresponding to the predetermined skewing relationship to be established.

While the embodiments of the present invention as herein disclosed constitute preferred forms, it is to be understood that other forms might be adopted.

What is claimed is as follows:

1. A stacked lamination slot skewing apparatus, comprising, a shiftable shim stack formed by a plurality of arcuate shims each having a body portion and a corresponding slot extending at least partially therealong, a tab-like projection located intermediate opposite ends of each body portion and engageable in a corresponding lamination notch, means extending through said slots for holding said shim stack together, said shims having differing arcuate lengths, peripheral shoulder-forming means of the shims being alignable on opposite ends thereof corresponding to notch positioning initially engageable in a straight edge manner, and a member shiftable to and fro against the shoulder-forming means for effecting movement of said shim stack between axial alignment of said tab-like projections and a predetermined skew position.

2. The apparatus of claim 1 wherein said means holding said shim stack together provide collective parallel limit stops as to movement of said shims in opposite directions, the opposite end of each shim being linearly engaged on a positive stop between axial and skewed alignment positions.

3. The apparatus of claim 1 wherein said shims collectively provide a herringbone lamination skew arrangement in one position.

4. The apparatus of claim 1 wherein said apparatus includes at least a pair of outer axial alignment members and a pivotable lid-like means to hold stacked laminations together.

5. The apparatus of claim 1 wherein shifting force is applied substantially tangentially to said shims.

6. A stacked lamination slot skewing apparatus comprising, a shiftable shim stack wherein each shim comprises an arcuate body portion having opposite edges engageable to shift said shim in opposite directions, a slot therein generally corresponding to the configuration of said arcuate body portion, outer shoulder portions engageable in opposite directions, and a radially inwardly extending tab-like projection engageable with internal notching of a lamination for shifting said lamination into a predetermined position in accordance with the arcuate length of the body portion and a member shiftable to and fro against said outer shoulder portions for effecting movement of said shim stack between axial alignment of said tab-like projections and a predetermined skew position.

References Cited by the Examiner

UNITED STATES PATENTS

| | | | |
|---|---|---|---|
| 532,820 | 1/1895 | Riddell | 29—205 |
| 1,090,920 | 3/1914 | Knight | 29—205 |
| 2,304,607 | 12/1942 | Sleeter | 29—155.5 |

JOHN F. CAMPBELL, *Primary Examiner.*

THOMAS H. EAGER, *Examiner.*